US011902839B2

(12) United States Patent
Lu et al.

(10) Patent No.: US 11,902,839 B2
(45) Date of Patent: Feb. 13, 2024

(54) DATA TRANSMISSION METHOD AND DEVICE, AND STORAGE MEDIUM

(71) Applicant: GUANGDONG OPPO MOBILE TELECOMMUNICATIONS CORP., LTD., Guangdong (CN)

(72) Inventors: Qianxi Lu, Guangdong (CN); Xin You, Guangdong (CN); Ning Yang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 453 days.

(21) Appl. No.: 17/194,257

(22) Filed: Mar. 6, 2021

(65) Prior Publication Data

US 2021/0195474 A1 Jun. 24, 2021

Related U.S. Application Data

(63) Continuation of application No. PCT/CN2018/106560, filed on Sep. 19, 2018.

(51) Int. Cl.
*H04W 72/23* (2023.01)
*H04W 36/00* (2009.01)
*H04J 3/02* (2006.01)
*H04W 36/08* (2009.01)

(52) U.S. Cl.
CPC .......... *H04W 36/0055* (2013.01); *H04J 3/02* (2013.01); *H04W 36/08* (2013.01); *H04W 72/23* (2023.01)

(58) Field of Classification Search
CPC ............... H04W 8/24; H04W 36/0055; H04W 36/0061; H04W 6/058; H04W 36/08; H04W 72/23
See application file for complete search history.

(56) References Cited

U.S. PATENT DOCUMENTS

| 10,560,926 | B2 * | 2/2020 | Luo ........................ H04W 72/21 |
| 2014/0092890 | A1 * | 4/2014 | Lee ........................ H04W 36/14 370/338 |
| 2014/0269512 | A1 * | 9/2014 | Koo ........................ H04W 76/16 370/328 |

(Continued)

FOREIGN PATENT DOCUMENTS

| CN | 101087288 A | 12/2007 |
| CN | 105009678 A | 10/2015 |

(Continued)

OTHER PUBLICATIONS

First Office Action for Chinese Application No. 201880097293.6 dated Dec. 2, 2022. 16 pages with English translation.

(Continued)

*Primary Examiner* — Jean A Gelin
(74) *Attorney, Agent, or Firm* — PERKINS COIE LLP

(57) ABSTRACT

Disclosed is a data transmission method. The method comprises: a terminal device performing data transmission with a first network device and/or a second network device according to a time division multiplexing mode, the time division multiplexing mode indicating information associated with data transmission performed between the terminal device and the first network device and/or the second network device. Further disclosed are another data transmission method, a terminal device, and a storage medium.

26 Claims, 4 Drawing Sheets

(56) References Cited

U.S. PATENT DOCUMENTS

| | | | |
|---|---|---|---|
| 2014/0348146 A1 | 11/2014 | Malkamäki et al. | |
| 2015/0023243 A1* | 1/2015 | Liu | H04L 12/189 370/312 |
| 2015/0036506 A1* | 2/2015 | Jiang | H04W 76/12 370/237 |
| 2015/0223077 A1 | 8/2015 | Fan et al. | |
| 2016/0007261 A1 | 1/2016 | Oh et al. | |
| 2016/0205681 A1* | 7/2016 | Kim | H04W 72/21 370/329 |
| 2017/0230104 A1 | 8/2017 | Purkayastha et al. | |
| 2018/0020382 A1* | 1/2018 | Kim | H04W 48/02 |
| 2019/0124563 A1* | 4/2019 | Zhang | H04B 7/15 |
| 2019/0229878 A1* | 7/2019 | Takeda | H04W 72/23 |
| 2019/0350011 A1* | 11/2019 | Li | H04W 74/0858 |
| 2020/0007201 A1* | 1/2020 | Liu | H04B 7/0478 |
| 2020/0021978 A1* | 1/2020 | Chai | H04W 76/27 |
| 2020/0022117 A1* | 1/2020 | Dong | H04L 1/08 |
| 2020/0112355 A1* | 4/2020 | Park | H04L 5/0094 |
| 2020/0119858 A1* | 4/2020 | Ren | H04W 72/12 |
| 2020/0119889 A1* | 4/2020 | Jiang | H04L 1/18 |
| 2020/0145324 A1* | 5/2020 | Wei | H04L 65/40 |
| 2020/0178209 A1* | 6/2020 | Jin | H04W 36/0055 |
| 2020/0178276 A1* | 6/2020 | Feng | H04W 72/1268 |
| 2020/0229180 A1* | 7/2020 | Liu | H04W 76/19 |
| 2020/0229204 A1* | 7/2020 | Gilson | H04W 72/54 |
| 2020/0267545 A1* | 8/2020 | Chang | H04L 63/062 |
| 2021/0092736 A1* | 3/2021 | Tang | H04L 65/40 |
| 2021/0099930 A1* | 4/2021 | Yao | H04L 1/1841 |
| 2022/0039113 A1* | 2/2022 | Choi | H04W 72/1263 |

FOREIGN PATENT DOCUMENTS

| | | |
|---|---|---|
| CN | 105103613 A | 11/2015 |
| CN | 105490789 A | 4/2016 |
| CN | 105917702 A | 8/2016 |
| CN | 107371195 A | 11/2017 |
| CN | 108513698 A | 9/2018 |
| EP | 3031240 A1 | 6/2016 |
| WO | 2016090124 A1 | 6/2016 |

OTHER PUBLICATIONS

Huang et al. "Advanced Handoff Algorithm for Multi-Service CDMA System" Data Communication, 2003; Issue 3; pp. 33-36.

InterDigital Communications "MAC Layer Impact of Supporting Different Numerologies" R1-1612357; 3GPP TSG RAN WG1 #87; Reno, Nevada; Nov. 14-18, 2016. 4 pages.

International Search Report dated May 29, 2019 of PCT PCT/CN2018/106560 (4 pages).

Second Office Action of the CN application No. 201880097293.6, dated Apr. 22, 2023. 15 pages with English translation.

Decision of Rejection of the CN application No. 201880097293.6, dated Jun. 13, 2023. 10 pages with English translation.

Extended European Search Report for European Application No. 18933928.6, dated Aug. 16, 2021. 13 pages.

Huawei et al. "Close to 0 ms HO interruption time for single Tx/Rx UE" R2-1703382; 3GPP TSF-RAN WG2 #97bis; Apr. 3-7, 2017. 8 pages.

Oppo, "Discussion on target scenarios for Mobility enhancement in E-UTRAN" R2-1813793; 3GPP TSG RAN WG2 Meeting #103bis, Oct. 8-12, 2018. 2 pages.

1 First Office Action of the European application No. 18933928.6, dated Mar. 1, 2022. 10 pages.

* cited by examiner

DATA TRANSMISSION METHOD AND DEVICE, AND STORAGE MEDIUM

CROSS-REFERENCE TO RELATED APPLICATION

The present application is a continuation application of International PCT Application No. PCT/CN2018/106560, filed on Sep. 19, 2018, the entire content of which is hereby incorporated by reference.

TECHNICAL FIELD

The present disclosure relates to the technical field of wireless communication, in particular, to a data transmission method, a device and a storage medium.

BACKGROUND

In a cell handover process in the related art, as shown in FIG. 1, after a terminal device obtains a Radio Resource Control (RRC) Reconfiguration message, based on the RRC Reconfiguration message, the terminal device reconfigures the Packet Data Convergence Protocol (PDCP)/Radio Link Control (RLC)/Media Access Control (MAC)/Low Layer, etc., as the Stack of a target base station, and Up Link (UL)/Down Link (DL) data transceiving between the terminal device and a source base station is stopped. Therefore, in the cell handover process, the terminal device only performs the data transceiving with one of the target base station or the source base station.

In order to realize a handover delay of 0ms in the cell handover process, two sets of PDCP/RLCMAC/Low Layer stacks may be maintained, which are respectively used for operations such as maintaining the data/signaling transmission between the terminal device and the source base station and between the terminal device and the target base station. However, at present, there is no effective solution about how a terminal device incapable of simultaneously supporting uplink data transceiving or downlink data transceiving in both a source cell and a target cell performs data transmission between the base station and the terminal device.

SUMMARY

In order to solve the above technical problems, implementations of the present disclosure provide a method for data transmission, a device and a storage medium, which realize data transmission between a base station a and terminal device that is incapable of simultaneously supporting uplink data transceiving or downlink data transceiving in both a source cell and a target cell.

In a first aspect, an implementation of the present disclosure provides a method for data transmission, including: a terminal device performs data transmission with a first network device and/or a second network device based on a time division multiplexing mode; wherein the time division multiplexing mode is used for indicating information for performing data transmission between the terminal device and the first network device and/or the second network device.

In a second aspect, an implementation of the present disclosure provides a method for data transmission, including: a first network device acquires a time division multiplexing mode; the first network device sends the time division multiplexing mode to a terminal device; wherein the time division multiplexing mode is used for indicating information for performing data transmission between the terminal device and the first network device and/or the second network device.

In a third aspect, an implementation of the present disclosure provides a terminal device, including: a first processing unit configured to perform data transmission with a first network device and/or a second network device based on a time division multiplexing mode; wherein the time division multiplexing mode is used for indicating information for performing data transmission between the terminal device and the first network device and/or the second network device.

In a fourth aspect, an implementation of the present disclosure provides a first network device, including:
   a second processing unit configured to acquire a time division multiplexing mode;
   a fourth sending unit configured to send the time division multiplexing mode to a terminal device;
   wherein the time division multiplexing mode is used for indicating information for performing data transmission between the terminal device and the first network device and/or the second network device.

In a fifth aspect, an implementation of the present disclosure further provides a terminal device, including: a processor and a memory configured to store a computer program which is runnable on the processor, wherein the processor is configured to execute, when running the computer program, acts of the method for data transmission executed by the above terminal device.

In a sixth aspect, an implementation of the present disclosure further provides a network device, including: a processor and a memory configured to store a computer program which is runnable on the processor, wherein the processor is configured to execute, when running the computer program, acts of the method for data transmission executed by the above network device.

In a seventh aspect, an implementation of the present disclosure provides a storage medium in which an executable program is stored, and when the executable program is executed by a processor, the method for data transmission executed by the above terminal device is implemented.

In an eighth aspect, an implementation of the present disclosure provides a storage medium in which an executable program is stored, and when the executable program is executed by a processor, the method for data transmission executed by the above network device is implemented.

According to the method for data transmission provided by the implementations of the present disclosure, the terminal device can perform data transmission with the first network device and/or the second network device based on the information for performing the data transmission between the terminal device and the first network device and/or the second network device indicated by the time division multiplexing mode. Thereby the data transmission between a base station and a terminal device incapable of supporting simultaneous uplink data transceiving or downlink data transceiving in both a source cell and a target cell, is implemented.

DETAILED DESCRIPTION

In order to understand features and technical contents of implementations of the present disclosure in more detail, realizations of the implementations of the present disclosure will be described in detail below with reference to accompanying drawings, and the accompanying drawings are used for reference only but are not intended to limit the implementations of the present disclosure.

In order to solve the problem in the related art that uplink transmission cannot be stopped in time, in an implementation of the present disclosure, a terminal device frequently detects a transmission stop signal so as to stop data transmission in time. However, frequent detection of a transmission stop signal will inevitably increase power consumption and detection complexity. Especially, when the transmission stop signal is carried in the downlink control signaling, a busyness detection is required, which further increases the detection complexity and increases the signaling overhead.

In this regard, the present disclosure provides a method for data transmission, and the method for data transmission of an implementation of the present disclosure may be applied to various communication systems, such as a Global System of Mobile communication (GSM) system, a Code Division Multiple Access (CDMA) system, a Wideband Code Division Multiple Access (WCDMA) system, a General Packet Radio Service (GPRS), a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communication system, or a 5G system.

Figure 1:
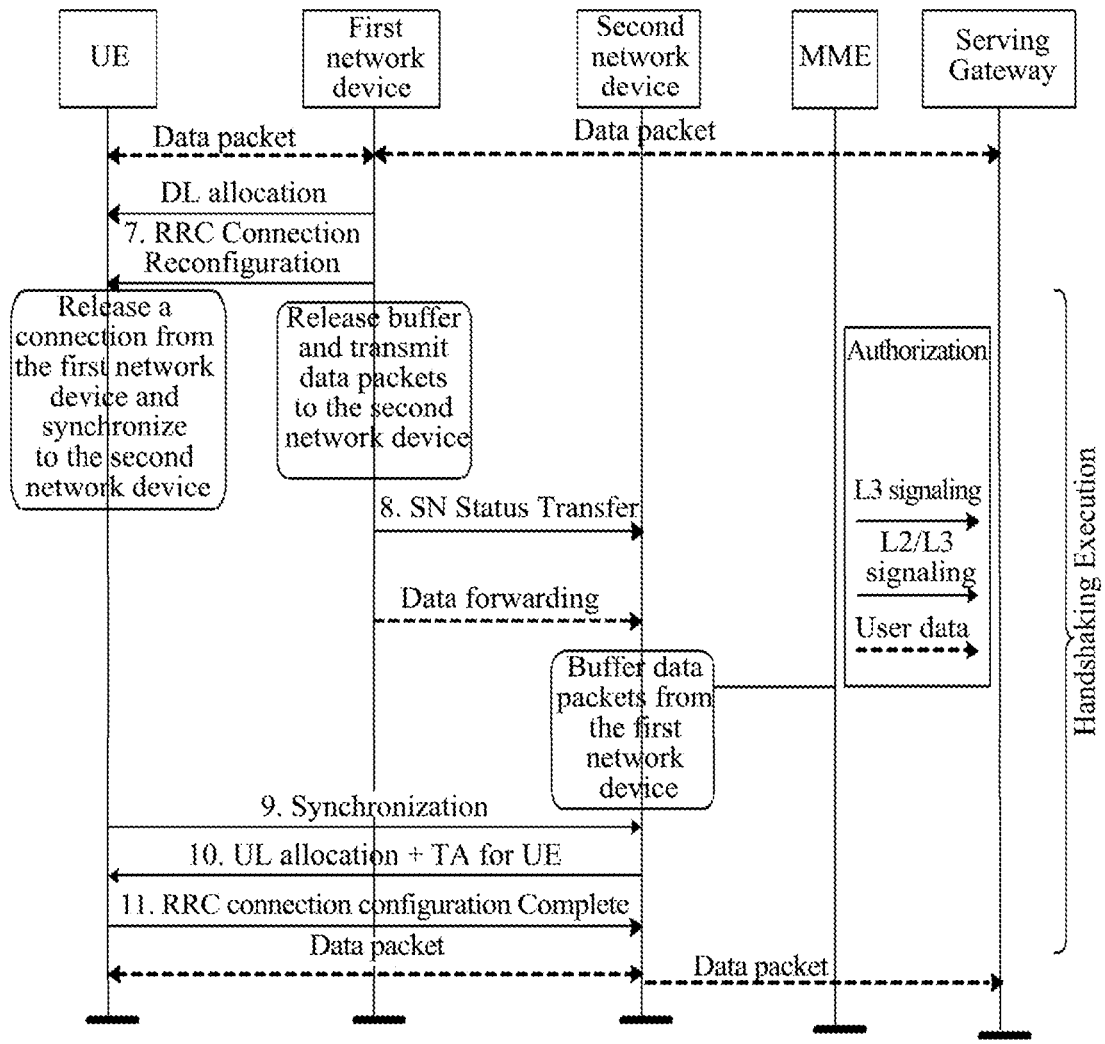
FIG. 1 is a schematic flowchart of a cell handover process in the related art.
Figure 2:
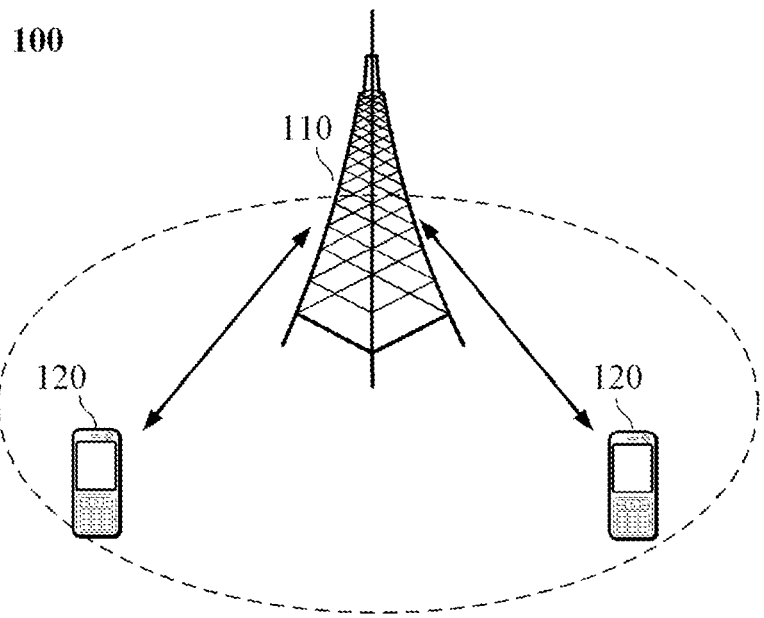
FIG. 2 is a schematic diagram of a structure of a communication system of an implementation of the present disclosure.

Illustratively, a communication system 100 applied in an implementation of the present disclosure is as shown in FIG. 2. The communication system 100 may include a network device 110, and the network device 110 may be a device that communicates with a terminal device 120 (or referred to as a communication terminal, or a terminal). The network device 110 may provide communication coverage for a specific geographical area, and may communicate with terminal devices located within the coverage area. Optionally, the network device 110 may be a Base Transceiver Station (BTS) in a GSM system or CDMA system, a NodeB (NB) in a WCDMA system, an Evolutional Node B (eNB or eNodeB) in an LTE system, or a radio controller in a Cloud Radio Access Network (CRAN), or the network device may be a mobile switch center, a relay station, an access point, a vehicle-mounted device, a wearable device, a hub, a switch, a bridge, a router, or a network side device in a 5G network, or a network device in a future evolved Public Land Mobile Network (PLMN), etc.

The communication system 100 also includes at least one terminal device 120 located within the coverage range of the network device 110. As used herein, the term "terminal device" includes, but is not limited to, a device configured to connect via a wired circuit, for example, via a Public Switched Telephone Network (PSTN), a Digital Subscriber Line (DSL), a digital cable, a direct cable; and/or another data connection/network; and/or via a wireless interface, for instance, for a cellular network, a Wireless Local Area Network (WLAN), a digital television network such as a Digital Video Broadcasting-Handheld (DVB-H) network, a satellite network, and an AM-FM broadcast transmitter; and/or an apparatus, of another communication terminal, configured to receive/send a communication signal; and/or an Internet of Things (IoT) device. A terminal device configured to communicate via a wireless interface may be referred to as a "wireless communication terminal", a "wireless terminal" or a "mobile terminal". Examples of the mobile terminal include, but are not limited to, a satellite or cellular telephone, a Personal Communication System (PCS) terminal capable of combining with a cellular wireless telephone and data processing, faxing, and data communication abilities, a Personal Digital Assistant (PDA) that may include a radio telephone, a pager, an internet/intranet access, a Web browser, a memo pad, a calendar, and/or a Global Positioning System (GPS) receiver, and a conventional laptop and/or palmtop receiver or other electronic apparatus including a radio telephone transceiver. The terminal device may be referred to as an access terminal, a User Equipment (UE), a subscriber unit, a subscriber station, a mobile station, a mobile platform, a remote station, a remote terminal, a mobile device, a user terminal, a terminal, a wireless communication device, a user agent, or a user apparatus. The access terminal may be a cellular phone, a cordless phone, a Session Initiation Protocol (SIP) phone, a Wireless Local Loop (WLL) station, a Personal Digital Assistant (PDA), a handheld device or a computing device with a wireless communication function, or another processing device, a vehicle-mounted device, or a wearable device connected to a wireless modem, a terminal device in a 5G network, or a terminal device in a future evolved Public Land Mobile Network (PLMN), or the like.

Optionally, a Device to Device (D2D) communication may be performed between the terminal devices 120.

Optionally, the 5G system or 5G network may be referred to as a New Radio (NR) system or an NR network.

FIG. 2 shows one network device and two terminal devices as an example. Optionally, the wireless communication system 100 may include multiple network devices, and other quantity of terminal devices may be included within the coverage range of each network device, and this is not limited in the implementations of the present disclosure.

Optionally, the communication system 100 may include other network entities such as a network controller, and a mobile management entity, and this is not limited in the implementations of the present disclosure.

It should be understood that, a device with a communication function in a network/system in an implementation of the present disclosure may be referred to as a terminal device. The communication system 100 shown in FIG. 2 is taken as an example, the communication device may include a network device 110 and terminal devices 120 having communication functions, and the network device 110 and the terminal devices 120 may be the specific devices described above, which will not be described here again. The communication device may also include other devices in the communication system 100, such as network controllers, mobile management entities, and other network entities, and this is not limited in the implementations of the present disclosure.

Figure 3:
FIG. 3 is a schematic diagram of an optional processing flow of a method for data transmission applied to a terminal device of an implementation of the present disclosure.

As shown in FIG. 3, an optional processing flow of a method for data transmission applied to terminal device according to an implementation of the present disclosure includes the following act S201.

In S201, a terminal device performs data transmission with a first network device and/or a second network device based on a time division multiplexing mode.

Here, the time division multiplexing mode is used for indicating information for performing data transmission between the terminal device and the first network device and/or the second network device.

The information for performing data transmission between the terminal device and the first network device and/or the second network device includes at least one of the following: a time for performing data transmission between the terminal device and the first network device and/or the second network device; and the terminal device performs beam switch, or radio frequency switch, or both the beam switch and the radio frequency switch.

For downlink data reception, the time division multiplexing mode is used for the terminal device to switch a receiving beam and/or a receiving radio frequency chain, such that the terminal device receives scheduling and data at a specific time point in a specific cell when it does not support simultaneously receiving data of multiple cells. At this time, with regard to the time division multiplexing mode, a factor of beam switch and/or a factor of radio frequency chain switch will be taken into account. For an inter-frequency handover, the time division multiplexing mode must take the factor of the radio frequency chain switch into account. For an intra-frequency handover, if the communication system supports beam transmission, the time division multiplexing mode must take the factor of the beam switch into account.

For transmitting of uplink data, the time division multiplexing mode is used for the terminal device to switch a transmitting beam and/or a transmitting radio frequency chain, such that the terminal device transmits uplink data and control information at a specific time point in a specific cell when it does not support simultaneous transmitting in multiple cells. For the inter-frequency handover, the time division multiplexing mode must take the factor of the radio frequency chain switch into account. For the intra-frequency handover, if the communication system supports beam transmission, the time division multiplexing mode must take the factor of the beam switch into account.

In some implementations, the time division multiplexing mode is carried in a cell handover command sent by the first network device to the terminal device. Specifically, the time division multiplexing mode may be determined by the first network device, it may also be determined by the second network device and then sent to the first network device, or it may also be determined through mutual negotiation between the first network device and the second network device. In determination of the time division multiplexing mode, if time slots and/or uplink and downlink configurations of the first network device and those of the second network device are different, different parameters (time slots and/or uplink and downlink configurations) and duplex mode of the terminal device need to be taken into consideration when determining the time division multiplexing mode.

In some implementations, the time division multiplexing mode may be notified to the second network device in a handover request message sent by the first network device to the second network device, or may also be notified by the first network device to the third network device in a process of Secondary Node Addition, such as SgNB addition. Optionally, the second network device or the third network device selects its own available uplink transmission time point and downlink transmission time point according to the time division multiplexing mode notified by the first network device and sends the available uplink transmission time point and downlink transmission time point to the first network device; the first network device finally determines the finally used time division multiplexing mode according to interaction information, and then configures the time division multiplexing mode for the terminal device.

Figure 4:
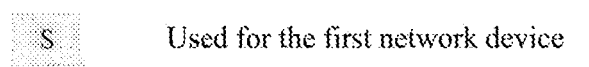
FIG. 4 is an optional schematic diagram of scheduling and data transmission between a terminal device and a first network device and/or a second network device at each time point in a cell handover process of an implementation of the present disclosure.
Figure 4:
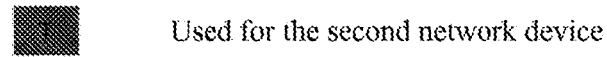
Figure 4:
Figure 4:
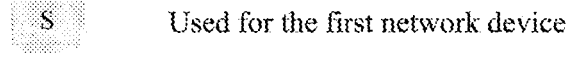
Figure 4:
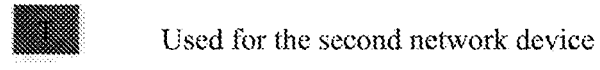

Optionally, the time division multiplexing mode is a preconfigured time division multiplexing mode used in the cell handover process after the terminal device receives the cell handover command sent by the first network device. An optional schematic diagram of scheduling and data transmission between a terminal device and a first network device and/or a second network device at each time point in a cell handover process is as shown in FIG. 4.

In some other implementations, the time division multiplexing mode is preconfigured by the first network device. In a specific implementation, the pre-configuration may be predefined in a protocol, or may also be configured to the terminal device when the terminal device gets an access. When the terminal device meets a condition of using the time division multiplexing mode, the terminal device starts to use the time division multiplexing mode. When the terminal device meets a conditions of stopping using the time division multiplexing mode, the terminal device stops using the time division multiplexing mode.

In a specific implementation, the terminal device sends capability information of the terminal device to the first network device, wherein the capability information is used for the first network device and/or the second network device to configure the time division multiplexing mode.

In an implementation of the present disclosure, the capability information includes at least one of the following: data dual receiving capability, data dual transmitting capability and handover capability information. The handover capability information includes at least one of the following: beam switch time delay information, radio frequency switch time delay information, both the beam switch time delay information and radio frequency switch time delay information.

In the above, the data dual receiving capability and data dual transmitting capability include capability of a radio frequency chain and/or capability of a beam. In a specific implementation, the data dual receiving capability and data dual transmitting capability may be reported when the terminal device establishes a connection with the first network device, or may be reported when the first network device triggers the terminal device, or may be acquired when the first network device interacts with another network device.

When the capability information indicates an absence of data dual transmitting capability, the terminal device only supports a single transmission beam or a single transmission radio frequency chain, or the terminal device supports dual beams and dual radio frequencies but does not support simultaneous transmitting in the same frequency band in multiple cells at the same time point, and the terminal device cannot perform dual-uplink beam transmission.

When the capability information indicates an absence of data dual receiving capability, the terminal device only supports a single transmission beam or a single transmission radio frequency chain, or the terminal device supports dual beams and dual radio frequencies, but does not support simultaneous receiving in the same frequency band in multiple cells at the same time point, and the terminal device cannot perform dual-downlink beam transmission.

Data transmission between the terminal device and the first network device and/or the second network device based on the time division multiplexing mode for different application scenarios is described below.

1) When the terminal device does not support a data uplink dual transmitting and receives a time division multiplexing mode for downlink, the terminal device determines a time point at which the data transmission can be performed according to PDCCH scheduling, and determines a beam direction and selects a radio frequency chain based on the time division multiplexing mode and PDCCH scheduling information. At another time point, the terminal device may determine the beam direction and the selection of the radio frequency chain according to actual needs of data transmission. Optionally, the other time point is a time point at which the terminal device initiates a random access procedure.

2) When the terminal device supports simultaneous receiving of data of multiple cells, the terminal device sends the capability of supporting the simultaneous receiving of data of multiple cells to the first network device and/or the second network device. If the terminal device only sends the capability of supporting the simultaneous receiving of data of multiple cells to the first network device or to the second network device, an interaction of the capability information is performed between the first network device and the second network device, such that the first network device and the second network device schedule the terminal device to simultaneously receive the scheduled transmissions of the multiple cells at the same time point.

3) When the terminal device supports simultaneous transmitting of data of multiple cells, the terminal device sends the capability of supporting the simultaneous transmitting of data of multiple cells to the first network device and/or the second network device. If the terminal device only sends the capability of supporting the simultaneous transmitting of data of multiple cells to the first network device or to the second network device, an interaction of the capability information is performed between the first network device and the second network device, such that the first network device and the second network device schedule the terminal device to simultaneously transmit data in the multiple cells at the same time point.

4) When the terminal device does not support the data uplink dual transmitting and receives a time division multiplexing mode for uplink, the terminal device determines the beam direction and selects the radio frequency chain for the uplink transmission based on the time division multiplexing mode. Optionally, at another time point, the terminal device may determine the beam direction and the selection of the radio frequency chain according to the actual needs of data transmission. Optionally, the other time point is a time point at which the terminal device initiates the random access procedure. Optionally, the other time point is a time point for which uplink or downlink is not indicated in the time division multiplexing mode.

5) When the terminal device does not support a data downlink dual receiving and receives the time division multiplexing mode for downlink, the terminal device determines the beam direction and selects the radio frequency chain for the downlink transmission based on the time division multiplexing mode. Optionally, at another time point, the terminal device may determine the beam direction and the selection of radio frequency chain according to the actual needs of data transmission. Optionally, the other time point is a time point for which uplink or downlink is not indicated in the time division multiplexing mode.

6) When the terminal device does not support the data downlink dual receiving or the uplink dual transmitting and receives a time division multiplexing mode for uplink and downlink, the terminal device determines the beam direction and selects the radio frequency chain for uplink and downlink transmissions based on the time division multiplexing mode. Optionally, at another time point, the terminal device may determine the beam direction and the selection of radio frequency chain according to the actual needs of data transmission. Optionally, the other time point is a time point for which uplink or downlink is not indicated in the time division multiplexing mode.

It should be noted that the terminal device does not support the data uplink dual transmitting, which means that the terminal device does not have the capability of data dual transmitting, or does not support a capability of dual beam transmitting, or does not support a capability of dual time-frequency transmitting, or supports the dual beam and the dual radio frequency but does not support the simultaneous transmitting in the same frequency band in multiple cells at the same time point. The terminal device does not support the data downlink dual receiving, which means that the terminal device does not have the capability of data dual receiving, or does not support a capability of dual beam receiving, or does not support a capability of dual time-frequency receiving, or supports the dual beam and the dual radio frequency but does not support simultaneous receiving in the same frequency band in multiple cells at the same time point.

7) When the time of the first network device and the time of the second network device are not synchronized, the time division multiplexing mode includes a first time division multiplexing mode and a second time division multiplexing mode.

The first time division multiplexing mode is used for data transmission between the terminal device and the first network device; and the second time division multiplexing mode is used for data transmission between the terminal device and the second network device.

At this time, the terminal device performs information transmission with the first network device according to the first time division multiplexing mode and a subframe boundary of a cell corresponding to the first network device. The terminal device performs information transmission with the second network device according to the second time division multiplexing mode and a subframe boundary of a cell corresponding to the second network device.

8) When the time of the first network device and the time of the second network device are not synchronized, the time division multiplexing mode includes a third time division multiplexing mode, wherein the third time division multiplexing mode is used for the terminal device to perform data transmission with the first network device and/or the second network device.

In the above, the time of the first network device and the time of the second network device being not synchronized means that the clock of the first network device and the clock of the second network device are not synchronized. Further, the communication time between the first network device and the terminal device is different from the communication time between the second network device and the terminal device.

With regard to the scenario that the time of the first network device and the time of the second network device are not synchronized, the first network device and the second network device exchange information based on the time difference therebetween, and calculate the time difference. When the terminal device performs a cell handover, the time difference is included in a time period configured to the first network device or the second network device for data transmission. It can be understood as that including the time difference in the time period configured to the first network device or the second network device for data transmission means that the time difference between the first network device and the second network device is not explicitly configured.

Figure 5:
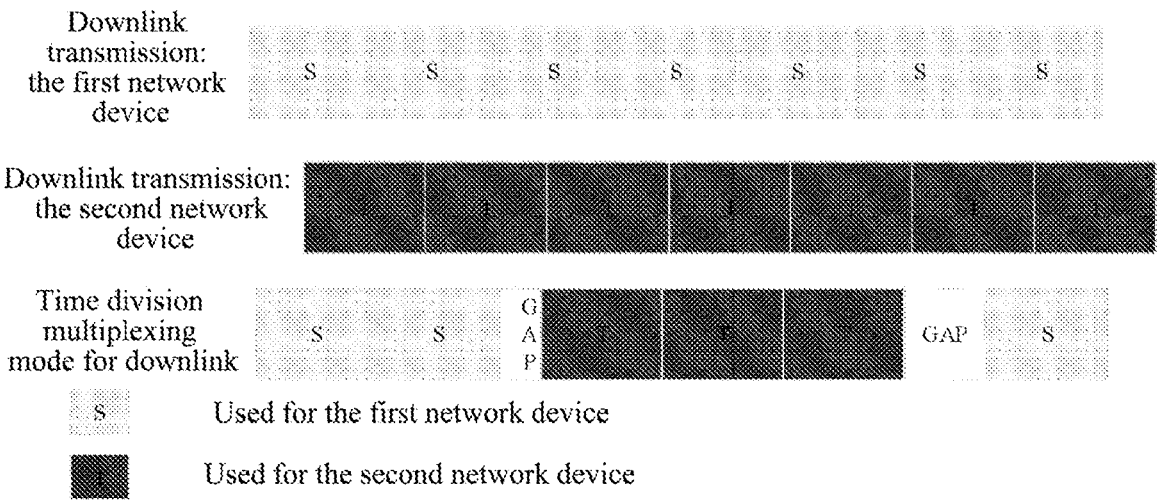
FIG. 5 is a schematic diagram of data transmission between a terminal device and a first network device and/or a second network device within a switch gap of an implementation of the present disclosure.

Or, with regard to the scenario that the time of the first network device and the time of the second network device are not synchronized, when configuring the time division multiplexing mode, the first network device or the second network device adds a configuration of switch gap time point. The time division multiplexing mode includes a switch gap time point, and/or an uplink time point, and/or a downlink time point. The behavior during the switch gap depends on an implementation by the terminal device. As shown in FIG. 5, during the switch gap, the terminal device performs data transmission with the first network device and/or the second network device. Or, during the switch gap, the terminal device does not perform data transmission with the first network device and/or the second network device.

It should be noted that in an implementation of the present disclosure, the time division multiplexing mode includes:

a time division multiplexing mode for downlink and/or a time division multiplexing mode for uplink.

For the time division multiplexing mode, it may be that one terminal device corresponds to one time division multiplexing mode or one cell corresponds to one time division multiplexing mode. When one cell corresponds to one time division multiplexing mode, all terminal devices in the cell correspond to the one time division multiplexing mode.

In an implementation of the present disclosure, the first network device is a source network device in a cell handover process, the second network device is a target network device in a cell handover process, the third network device is a network device in a Secondary Node Addition process, and the terminal device may be a terminal device incapable of supporting simultaneous uplink data transceiving or downlink data transceiving in both the source cell and the target cell.

Figure 6:
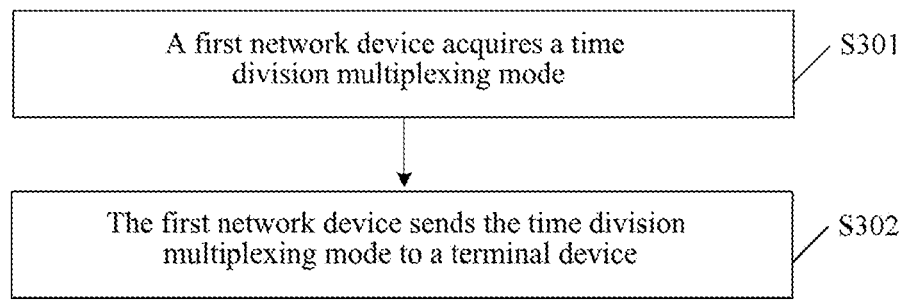
FIG. 6 is a schematic diagram of an optional processing flow of a method for data transmission applied to a first network device of an implementation of the present disclosure.

As shown in FIG. 6, an optional processing flow of a method for data transmission applied to a network device provided by an implementation of the present disclosure includes the following acts S301 and S302.

In S301, a first network device acquires a time division multiplexing mode.

In some implementations, the first network device receives the time division multiplexing mode sent by a second network device.

In some other implementations, the first network device receives capability information sent by a terminal device, determines and configures the time division multiplexing mode based on the capability information.

Here, the related descriptions about the information of data transmission between the terminal device and the first network device and/or the second network device, the capability information, and the handover capability information are the same as those in the above act S301, which will not be repeated here.

In S302, the first network device sends the time division multiplexing mode to a terminal device.

In some implementations, the first network device sends a cell handover command to the terminal device, wherein the cell handover command carries the time division multiplexing mode.

The method for data transmission provided by an implementation of the present disclosure further includes: the first network device receives a capability of supporting simultaneous receiving data of multiple cell sent by the terminal device, the first network device schedules the terminal device to simultaneously receive the scheduled transmission of the multiple cells at the same time point based on the capability of supporting the simultaneous receiving of data of multiple cells; and/or the first network device receives a capability of supporting simultaneous transmitting of data of multiple cells sent by the terminal, the first network device schedules the terminal device to simultaneously transmit data in multiple cells at the same time point based on the capability of supporting the simultaneous transmitting of data of multiple cells.

In a specific implementation, if the terminal device only sends to the first network device the capability of supporting the simultaneous receiving of data of multiple cells and/or the capability of supporting the simultaneous transmitting of data of multiple cells, the first network device needs to send to the second network device the received capability of supporting the simultaneous receiving of data of multiple cells and/or the capability of supporting the simultaneous transmitting of data of multiple cells.

When the terminal device supports the capability of simultaneous receiving of data of multiple cells, it may be scheduled by one of the first network device or the second network device, and the terminal device receives data in multiple cells. Or, the terminal device may be respectively scheduled by the first network device and the second network device, and the terminal device receives data in multiple cells.

When the terminal device supports the capability of simultaneous transmitting of data of multiple cells, it may be scheduled by one of the first network device or the second network device, and the terminal device transmits data in multiple cells. Or, the terminal device may be respectively scheduled by the first network device and the second network device, and the terminal device transmits data in multiple cells.

An implementation of the invention further provides an optional processing flow of a method for data transmission applied to a terminal device, a first network device and a second network device, which includes the following acts, act a, act b, and act c.

In act a, the first network device acquires a time division multiplexing mode.

In some implementations, the first network device receives the time division multiplexing mode sent by the second network device.

In some other implementations, the first network device receives capability information sent by the terminal device, determines and configures the time division multiplexing mode based on the capability information. The first network device sends the time division multiplexing mode to the second network device.

It can be understood that no matter whether the time division multiplexing mode is determined by the first network device or the second network device, communication between the first network device and the second network device needs to be performed, such that both the first network device and the second network device can acquire the time division multiplexing mode.

In act b, the first network device sends the time division multiplexing mode to the terminal device.

In act c, the terminal device performs data transmission with the first network device and/or the second network device based on the time division multiplexing mode.

Figure 7:
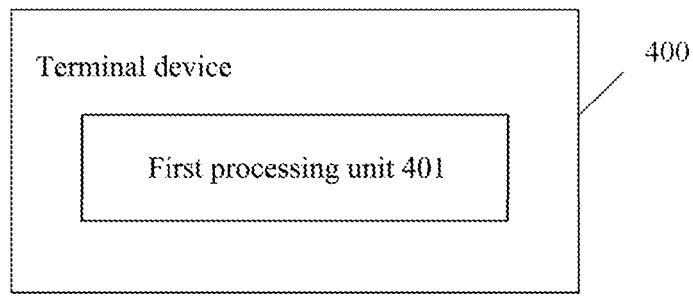
FIG. 7 is a schematic diagram of a structure of a terminal device of an implementation of the present disclosure.

An implementation of the present disclosure further provides a terminal device, a schematic structure diagram of the terminal device 400 is as shown in FIG. 7, the terminal device 400 includes a first processing unit 401.

The first processing unit 401 is configured to perform data transmission with a first network device and/or a second network device based on a time division multiplexing mode; wherein the time division multiplexing mode is used for indicating information for performing data transmission between the terminal device and the first network device and/or the second network device.

In an implementation of the present disclosure, the information for performing data transmission between the terminal device and the first network device and/or the second network device includes at least one of the following:
a time for performing data transmission between the terminal device and the first network device and/or the second network device; and
the terminal device performs beam switch, or radio frequency switch, or both the beam switch and the radio frequency switch.

In an implementation of the present disclosure, the terminal device further includes:
a first sending unit configured to send capability information of the terminal device to the first network device, wherein the capability information is used for the first network device to configure the time division multiplexing mode;
wherein the capability information includes at least one of the following information: data dual receiving capability, data dual transmitting capability, and handover capability information.

In an implementation of the present disclosure, the handover capability information at least includes one of the following:
beam switch time delay information;
radio frequency switch time delay information; and
both the beam switch delay information and the radio frequency switch delay information.

In an implementation of the present disclosure, the time division multiplexing mode is carried in a cell handover command sent by the first network device.

Or, the time division multiplexing mode is a preconfigured time division multiplexing mode used in the cell handover process after the terminal device receives the cell handover command sent by the first network device.

In an implementation of the present disclosure, the terminal device further includes:
a second sending unit configured to send to the first network device a capability of supporting simultaneous receiving of data of multiple cells; wherein the capability of supporting the simultaneous receiving of data of multiple cells is used for the first network device and the second network device to schedule the terminal device to simultaneously receive scheduled transmission of multiple cells at the same time point.

In an implementation of the present disclosure, the terminal device further includes:
a third sending unit configured to send to the first network device a capability of supporting simultaneous transmitting data of multiple cells; wherein the capability of supporting the simultaneous transmitting of data of multiple cells is used for the first network device and the second network device to schedule the terminal device to simultaneously transmit data in the multiple cells at the same time point.

In an implementation of the present disclosure, when the terminal device does not support a data uplink dual transmitting and receives a time division multiplexing mode for downlink, the first processing unit is configured to determines a time point at which the data transmission can be performed according to PDCCH scheduling, and determine a beam direction and select a radio frequency chain based on the time division multiplexing mode. The terminal device does not support the data uplink dual transmitting, which means that the terminal device does not have the capability of data dual transmitting, or does not support a capability of dual beam transmitting, or does not support a capability of dual time-frequency transmitting.

In an implementation of the present disclosure, when the time of the first network device and the time of the second network device are not synchronized, the time division multiplexing mode includes a first time division multiplexing mode and a second time division multiplexing mode; wherein the first time division multiplexing mode is used for performing data transmission between the first processing unit and the first network device; and the second time division multiplexing mode is used for performing data transmission between the first processing unit and the second network device.

Or, when the time of the first network device and the time of the second network device are not synchronized, the time division multiplexing mode includes a third time division multiplexing mode, wherein the third time division multiplexing mode is used for the terminal device to perform the data transmission with the first network device and/or the second network device.

In an implementation of the present disclosure, when the time of the first network device and the time of the second network device are not synchronized, the first processing unit 401 is further configured to acquire a configuration of a switch gap time point. The switch gap time point may be configured by the first network device or the second network device and then sent to the terminal device. At this time, an explicit switch gap time point is configured.

In an implementation of the present disclosure, when the time of the first network device and the time of the second network device are not synchronized, a time difference caused by the out-of-sync between the first network device and the second network device is included in a time period which is used by the first network device or the second network device for data transmission. It can be understood that at this time no explicit switch gap time point is configured.

In an implementation of the present disclosure, the first processing unit 401 is configured to perform the data transmission with the first network device and/or the second network device within the switch gap; or not to perform the data transmission with the first network device and/or the second network device within the switch gap.

In an implementation of the present disclosure, the time division multiplexing mode includes a time division multiplexing mode for downlink and/or a time division multiplexing mode for uplink.

The first network device is a source network device in the cell handover process, and the second network device is a target network device in the cell handover process.

Figure 8:
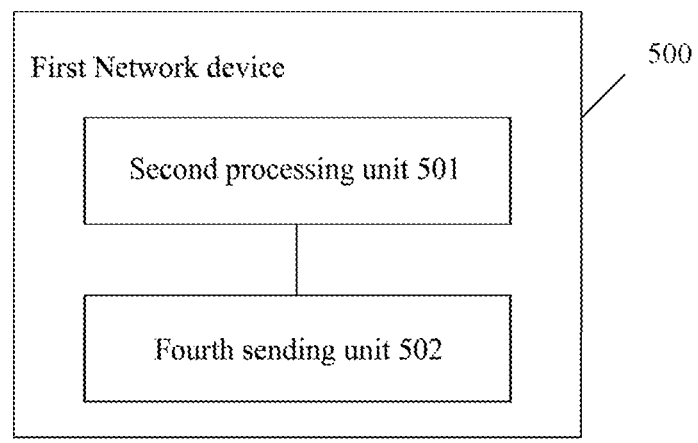
FIG. 8 is a schematic diagram of a structure of a first network device of an implementation of the present disclosure.

An implementation of the present disclosure further provides a first network device, a composition structure of the first network device 500 is as shown in FIG. 8, the first network device 500 includes a second processing unit 501 and a fourth sending unit 502.

The second processing unit 501 is configured to acquire a time division multiplexing mode.

The fourth sending unit 502 is configured to send the time division multiplexing mode to a terminal device.

The time division multiplexing mode is used for indicating information for performing data transmission between the terminal device and the first network device and/or the second network device.

In an implementation of the present disclosure, the information for performing the data transmission between the terminal device and the first network device and/or the second network device includes at least one of the following:

a time for performing the data transmission between the terminal device and the first network device and/or the second network device; and the terminal device performs beam switch, or radio frequency switch, or both the beam switch and the radio frequency switch.

In an implementation of the present disclosure, the second processing unit 501 is configured to receive capability information sent by the terminal device; and determine the time division multiplexing mode based on the capability information.

In an implementation of the present disclosure, the second processing unit 501 is configured to receive the time division multiplexing mode sent by the second network device.

In an implementation of the present disclosure, the capability information includes at least one of the following: data dual receiving capability, data dual transmitting capability, and handover capability information.

In an implementation of the present disclosure, the handover capability information at least includes one of the following:

beam switch time delay information;

radio frequency switch time delay information; and both the beam switch delay information and the radio frequency switch delay information.

In an implementation of the present disclosure, the fourth sending unit 502 is configured to send a cell handover command to the terminal device, wherein the cell handover command carries the time division multiplexing mode.

In an implementation of the present disclosure, the second processing unit 501 is configured to receive a capability of supporting simultaneous receiving of data of multiple cells sent by the terminal device; send to the second network device the capability of supporting the simultaneous receiving of data of multiple cells sent by the terminal device; and schedule the terminal device to simultaneously receive the scheduled transmission of the multiple cells at the same time point based on the capability of supporting the simultaneous receiving of data of multiple cells.

In an implementation of the present disclosure, the second processing unit 501 is configured to receive a capability of supporting simultaneous transmitting of data of multiple cells sent by the terminal device; send to the second network device the capability of supporting the simultaneous transmitting of data of multiple cells sent by the terminal device; and schedule the terminal device to simultaneously transmit the scheduled transmission for the multiple cells at the same time point based on the capability of supporting the simultaneous transmitting of data of multiple cells.

An implementation of the present disclosure further provides a terminal device, including: a processor and a memory configured to store a computer program which is runnable on the processor, wherein the processor is configured to execute, when running the computer program, acts of the method for data transmission executed by the above terminal device.

An implementation of the present disclosure further provides a network device, including: a processor and a memory configured to store a computer program which is runnable on the processor, wherein the processor is configured to execute, when running the computer program, acts of the method for data transmission executed by the above network device.

Figure 9:
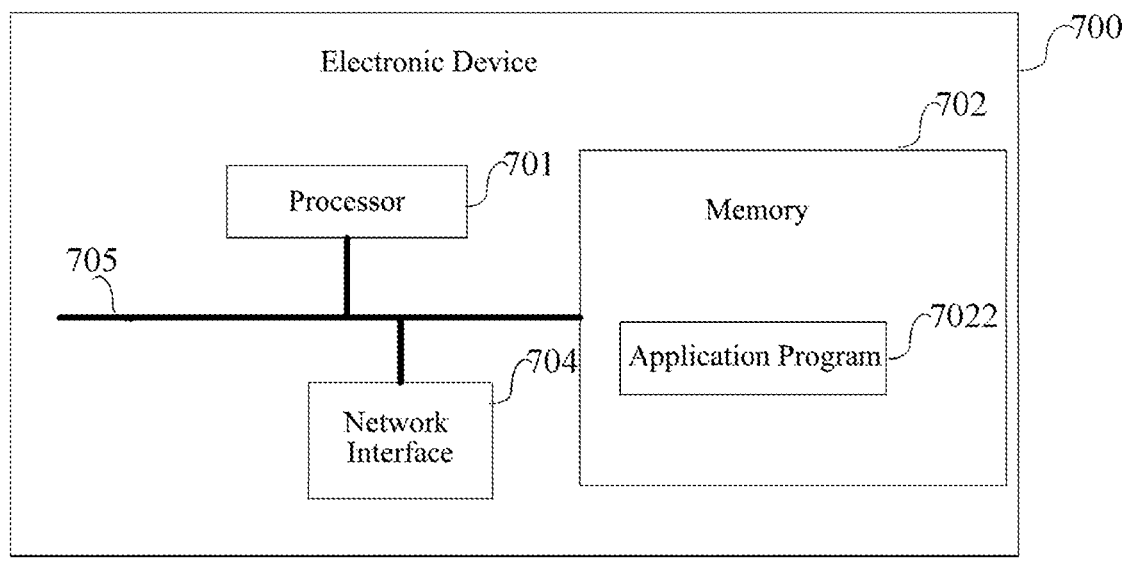
FIG. 9 is a schematic diagram of a hardware structure of an electronic device of an implementation of the present disclosure.

FIG. 9 is a schematic diagram of a hardware structure of an electronic device (network device or terminal device) of an implementation of the present disclosure, wherein the electronic device 700 includes at least one processor 701, a memory 702 and at least one network interface 704. Various components in the electronic device 700 are coupled together by a bus system 705. It may be understood that the bus system 705 is used for implementing connection and communication between these components. In addition to a data bus, the bus system 705 further includes a power bus, a control bus, and a status signal bus. However, for clarity of description, all types of buses are uniformly referred to as a bus system 705 in FIG. 9.

It can be understood that the memory 702 may be a volatile memory or a non-volatile memory, or may include both the volatile memory and the non-volatile memory. In the above, the non-volatile memory may be a Read Only Memory (ROM), a Programmable Read-Only Memory (PROM), an Erasable Programmable Read-Only Memory (EPROM), an Electrically Erasable Programmable Read-Only Memory (EEPROM), a ferromagnetic random access memory (FRAM), a Flash Memory, a magnetic surface memory, a compact disk, or a Compact Disc Read-Only Memory (CD-ROM), wherein the magnetic surface memory may be a magnetic disk memory or a magnetic tape memory. The volatile memory may be a Random Access Memory (RAM) which serves as an external cache. By way of exemplary but not restrictive illustrations, many forms of RAMs are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), a Direct Rambus Random Access Memory (DRRAM).

The memory 702 in an implementation of the present disclosure is configured to store various types of data to support operation of the electronic device 700. Examples of such data include any computer program for operating on the electronic device 700, such as an application program 7022. A program for implementing the method of the implementations of the present disclosure may be included in the application program 7022.

Methods disclosed in above implementations of the present disclosure may be applied in the processor 701 or implemented by the processor 701. The processor 701 may be an integrated circuit chip with a signal processing capability. In an implementation process, the acts of the methods described above may be accomplished by integrated logic circuits of hardware in the processor 701 or instructions in a form of software. The above-mentioned processor 701 may be a general-purpose processor, a Digital Signal Processor (DSP), or other programmable logic devices, discrete gate or transistor logic devices, discrete hardware components, etc. The processor 701 may implement or execute the methods, acts and logical block diagrams disclosed in the implementations of the present disclosure. The general purpose processor may be a microprocessor or any conventional processor or the like. Acts of the methods disclosed in combination with the implementations of the present disclosure may be directly embodied as being performed and accomplished by a hardware decoding processor or by a combination of hardware and software modules in a decoding processor. The software module may be located in a storage medium, and the storage medium is located in the memory 702. The processor 701 reads information in the memory 702 and accomplishes the acts of the aforementioned methods in combination with hardware thereof.

In an exemplary implementation, the electronic device 700 may be implemented by one or more Application Specific Integrated Circuits (ASICs), DSPs, Programmable Logic Devices (PLDs), Complex Programmable Logic Devices (CPLDs), FPGAs, general-purpose processors, controllers, MCUs (Micro Control Units), MPUs (Microprocessor Units) or other electronic components, for performing the aforementioned methods.

An implementation of the present disclosure further provides a computer readable storage medium configured to store a computer program.

Optionally, the computer readable storage medium may be applied to a network device in an implementation of the present disclosure, and the computer program enables a computer to perform the corresponding processes implemented by the network device in various methods of the implementations of the present disclosure, which will not be repeated here for sake of brevity.

Optionally, the computer readable storage medium may be applied to a terminal device in an implementation of the present disclosure, and the computer program enables a computer to perform the corresponding processes implemented by the terminal device in various methods of the implementations of the present disclosure, which will not be repeated here for sake of brevity.

The present disclosure is described with reference to flowcharts and/or block diagrams of methods, devices (systems), and computer program products according to implementations of the present disclosure. It should be understood that each flow and/or block in a flowchart and/or block diagram, and combinations of flows and/or blocks in a flowchart and/or block diagram can be implemented by computer program instructions. These computer program instructions may be provided to a processor of a general purpose computer, a special purpose computer, an embedded processor or other programmable data processing device to produce a machine, such that the instructions which are executed by the processor of the computer or other programmable data processing device produce means for implementing functions specified in one or more flows in a flow chart and/or one or more blocks in a block diagram.

These computer program instructions may also be stored in a computer-readable memory that can direct a computer or other programmable data processing device to operate in a specific manner, such that the instructions stored in the computer-readable memory produce an article of manufacture including instruction means that implement the functions specified in one or more flows of in a flowchart and/or one or more blocks in a block diagram.

These computer program instructions may also be loaded onto a computer or other programmable data processing device, such that a series of operational acts are performed on the computer or other programmable device produce a computer-implemented process, such that the instructions which are executed on the computer or other programmable device provide acts for implementing the functions specified in one or more flows in a flow chart and/or one or more blocks in a block diagram.

The above descriptions are only preferred implementations of the present disclosure but are not intended to limit the protection scope of the present disclosure. Any modification, equivalent substitution, improvement, etc. made within the spirit and principles of the present disclosure shall be covered by the protection scope of the present disclosure.

What is claimed is:

1. A method for data transmission, comprising:
performing, by a terminal device, data transmission with a first network device and/or a second network device based on a time division multiplexing mode;
wherein the time division multiplexing mode is used for indicating information for performing data transmission between the terminal device and the first network device and/or the second network device; wherein the method further comprises:
sending, by the terminal device, capability information of the terminal device to the first network device, wherein the capability information is used for the first network device to configure the time division multiplexing mode;
wherein the capability information comprises handover capability information, wherein the handover capability information comprises beam switch delay information and the radio frequency switch delay information.

2. The method of claim 1, wherein the information for performing the data transmission between the terminal device and the first network device and/or the second network device comprises at least one of the following:
a time for performing the data transmission between the terminal device and the first network device and/or the second network device; and
the terminal device performs beam switch, or radio frequency switch, or the beam switch and the radio frequency switch.

3. The method of claim 1, wherein the time division multiplexing mode is carried in a cell handover command sent by the first network device,
and the time division multiplexing mode is a preconfigured time division multiplexing mode used in a cell handover process after the terminal device receives the cell handover command sent by the first network device.

4. The method of claim 1, further comprising:
sending, by the terminal device, a capability of supporting simultaneous receiving of data of a plurality of cells to the first network device; wherein the capability of supporting the simultaneous receiving of data of a plurality of cells is used for the first network device and/or a second network device to schedule the terminal device to simultaneously receive scheduled transmission of the plurality of cells at a same time point, and,
sending, by the terminal device, a capability of supporting simultaneous transmitting of data of a plurality of cells to the first network device; wherein the capability of supporting the simultaneous transmitting of data of a plurality of cells is used for the first network device and/or the second network device to schedule the terminal device to simultaneously transmit data in the plurality of cells at a same time point.

5. The method of claim 1, wherein performing, by the terminal device, the data transmission with the first network device and/or the second network device based on the time division multiplexing mode comprises:
determining, by the terminal device, a time point at which the data transmission is capable of being performed, according to physical downlink control channel (PDCCH) scheduling, determining a beam direction and selecting a radio frequency chain based on the time division multiplexing mode, when the terminal device does not support a data uplink dual transmitting and receives a time division multiplexing mode for downlink.

6. The method of claim 1, wherein when time of the first network device and time of the second network device are not synchronized, the time division multiplexing mode comprises a first time division multiplexing mode and a second time division multiplexing mode;
wherein the first time division multiplexing mode is used for performing the data transmission between the terminal device and the first network device; and
the second time division multiplexing mode is used for performing the data transmission between the terminal device and the second network device,
or,
wherein when time of the first network device and time of the second network device are not synchronized, the time division multiplexing mode comprises a third time division multiplexing mode, and the third time division multiplexing mode is used for the terminal device to perform the data transmission with the first network device and/or the second network device,
wherein when time of the first network device and time of the second network device are not synchronized, a time difference caused by the out-of-sync between the first network device and the second network device is contained in a time period which is used by the first network device or the second network device for the data transmission.

7. The method of claim 1, wherein when time of the first network device and time of the second network device are not synchronized, the method further comprises:
acquiring a configuration of a switch gap time point,
wherein the terminal device performs the data transmission with the first network device and/or the second network device within the switch gap; or the terminal device does not perform the data transmission with the first network device and/or the second network device within the switch gap.

8. The method of claim 1, wherein the time division multiplexing mode comprises:
a time division multiplexing mode for downlink and/or a time division multiplexing mode for uplink.

9. The method of claim 1, wherein the first network device is a source network device in the cell handover process, and the second network device is a target network device in the cell handover process.

10. A method for data transmission, comprising:
acquiring, by a first network device, a time division multiplexing mode; and
sending, by the first network device, the time division multiplexing mode to a terminal device;
wherein the time division multiplexing mode is used for indicating information for performing data transmission between the terminal device and the first network device and/or the second network device; wherein acquiring, by the first network device, the time division multiplexing mode comprises:
receiving, by the first network device, capability information sent by the terminal device; and
determining, by the first network device, the time division multiplexing mode based on the capability information,
wherein the capability information comprises handover capability information, wherein the handover capability information comprises beam switch delay information and the radio frequency switch delay information.

11. The method of claim 10, wherein the information for performing the data transmission between the terminal device and the first network device and/or the second network device comprises at least one of the following:
a time for performing the data transmission between the terminal device and the first network device and/or the second network device; and
the terminal device performs beam switch, or radio frequency switch, or the beam switch and the radio frequency switch.

12. The method of claim 10, wherein sending, by the first network device, the time division multiplexing mode to the terminal device comprises:
sending, by the first network device, a cell handover command to the terminal device, wherein the cell handover command carries the time division multiplexing mode.

13. The method of claim 10, further comprising:
receiving, by the first network device, a capability of supporting simultaneous receiving of data of a plurality of cells sent by the terminal device;
sending, by the first network device, to the second network device the capability of supporting the simultaneous receiving of data of a plurality of cells sent by the terminal device; and
scheduling, by the first network device, the terminal device to simultaneously receive scheduled transmission of the plurality of cells at a same time point based on the capability of supporting the simultaneous receiving of data of a plurality of cells,
or,
receiving, by the first network device, a capability of supporting simultaneous transmitting of data of a plurality of cells sent by the terminal device;

sending, by the first network device, to the second network device the capability of supporting the simultaneous transmitting of data of a plurality of cells sent by the terminal device; and scheduling, by the first network device, the terminal device to simultaneously transmit data in the plurality of cells at a same time point based on the capability of supporting the simultaneous transmitting of data of a plurality of cells.

14. The method of claim 10, wherein when time of the first network device and time of the second network device are not synchronized, the method further comprises:

configuring, by the first network device, a switch gap time point, or, wherein when time of the first network device and time of the second network device are not synchronized, the method further comprises:

configuring, by the first network device, a time difference caused by the out-of-sync between the first network device and the second network device to be contained in a time period used by the first network device or the second network device for the data transmission.

15. A terminal device, comprising: a processor and a memory configured to store a computer program which is runnable on the processor, wherein the processor is configured to, when running the computer program, perform data transmission with a first network device and/or a second network device based on a time division multiplexing mode;

wherein the time division multiplexing mode is used for indicating information for performing data transmission between the terminal device and the first network device and/or the second network device; wherein the processor is further configured to, when running the computer program, send capability information of the terminal device to the first network device, wherein the capability information is used for the first network device to configure the time division multiplexing mode;

wherein the capability information comprises handover capability information, wherein the handover capability information comprises the beam switch delay information and the radio frequency switch delay information.

16. The terminal device of claim 15, wherein the information for performing data transmission between the terminal device and the first network device and/or the second network device comprises at least one of the following:

a time for performing the data transmission between the terminal device and the first network device and/or the second network device; and the terminal device performs beam switch, or radio frequency switch, or the beam switch and the radio frequency switch.

17. The terminal device of claim 15, wherein the time division multiplexing mode is carried in a cell handover command sent by the first network device, and wherein the time division multiplexing mode is a preconfigured time division multiplexing mode used in a cell handover process after the terminal device receives the cell handover command sent by the first network device.

18. The terminal of claim 15, wherein the processor is further configured to, when running the computer program, send to the first network device a capability of supporting simultaneous receiving of data of a plurality of cells;

wherein the capability of supporting the simultaneous receiving of data of a plurality of cells is used for the first network device and/or a second network device to schedule the terminal device to simultaneously receive scheduled transmission of the plurality of cells at a same time point, and, send to the first network device a capability of supporting simultaneous transmitting data of a plurality of cells; wherein the capability of supporting the simultaneous transmitting of data of a plurality of cells is used for the first network device and/or the second network device to schedule the terminal device to simultaneously transmit data in the plurality of cells at a same time point.

19. The terminal device of claim 15, wherein when the terminal device does not support a data uplink dual transmitting and receives a time division multiplexing mode for downlink, the processor is further configured to, when running the computer program, determine a time point at which the data transmission is capable of being performed according to physical downlink control channel (PDCCH) scheduling, and determine a beam direction and select a radio frequency chain based on the time division multiplexing mode.

20. The terminal device of claim 15, wherein when time of the first network device and time of the second network device are not synchronized, the time division multiplexing mode comprises a first time division multiplexing mode and a second time division multiplexing mode; wherein the first time division multiplexing mode is used for performing the data transmission between the processor and the first network device; and the second time division multiplexing mode is used for performing the data transmission between the processor and the second network device, or, wherein when time of the first network device and time of the second network device are not synchronized, the time division multiplexing mode comprises a third time division multiplexing mode, and the third time division multiplexing mode is used for the terminal device to perform the data transmission with the first network device and/or the second network device;

wherein when time of the first network device and time of the second network device are not synchronized, a time difference caused by the out-of-sync between the first network device and the second network device is contained in a time period which is used by the first network device or the second network device for the data transmission.

21. The terminal device of claim 15, wherein when time of the first network device and time of the second network device are not synchronized, the processor acquires a configuration of a switch gap time point, wherein the processor is further configured to perform the data transmission with the first network device and/or the second network device within the switch gap; or not to perform the data transmission with the first network device and/or the second network device within the switch gap.

22. A first network device, comprising: a processor and a memory configured to store a computer program which is runnable on the processor, wherein the processor is configured to, when running the computer program, acquire a time division multiplexing mode; and send the time division multiplexing mode to a terminal device;

wherein the time division multiplexing mode is used for indicating information for performing data transmission between the terminal device and the first network device and/or the second network device; wherein the processor is further configured to, when running the computer program, receive capability information sent by the terminal device; and determine the time division multiplexing mode based on the capability information, wherein the capability information comprises handover capability information, wherein the handover capability information comprises the beam switch delay information and the radio frequency switch delay information.

23. The first network device of claim 22, wherein the information for performing the data transmission between the terminal device and the first network device and/or the second network device comprises at least one of the following:

a time for performing the data transmission between the terminal device and the first network device and/or the second network device; and the terminal device performs beam switch, or radio frequency switch, or the beam switch and the radio frequency switch.

24. The first network device of claim 22, wherein the processor is further configured to, when running the computer program, send a cell handover command to the terminal device, the cell handover command carries the time division multiplexing mode.

25. The first network device of claim 22, wherein the processor is further configured to, when running the computer program, receive a capability of supporting simultaneous receiving of data of a plurality of cells sent by the terminal device;

send to the second network device the capability of supporting the simultaneous receiving of data of a plurality of cells sent by the terminal device; and schedule the terminal device to simultaneously receive scheduled transmission of the plurality of cells at a same time point based on the capability of supporting the simultaneous receiving of data of a plurality of cells, or, wherein the processor is further configured to, when running the computer program, receive a capability of supporting simultaneous transmitting of data of a plurality of cells sent by the terminal device;

send to the second network device the capability of supporting the simultaneous transmitting of data of a plurality of cells sent by the terminal device; and schedule the terminal device to simultaneously transmit data in the plurality of cells at a same time point based on the capability of supporting the simultaneous transmitting of data of a plurality of cells.

26. The first network device of claim 22, wherein when time of the first network device and time of the second network device are not synchronized, the processor is further configured to, when running the computer program, configure a switch gap time point, or, wherein when time of the first network device and time of the second network device are not synchronized, the processor is further configured to, when running the computer program, configure a time difference caused by the out-of-sync between the first network device and the second network device to be contained in a time period which is used by the first network device for the data transmission.

* * * * *